United States Patent
Yamamoto et al.

(10) Patent No.: US 9,209,452 B2
(45) Date of Patent: Dec. 8, 2015

(54) NON-AQUEOUS ELECTROLYTE SECONDARY BATTERY

(75) Inventors: Dai Yamamoto, Kanagawa (JP); Shinsuke Matsuno, Tokyo (JP); Yoshinao Tatebayashi, Nagano (JP); Norio Takami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 79 days.

(21) Appl. No.: 13/983,205

(22) PCT Filed: Jan. 24, 2012

(86) PCT No.: PCT/JP2012/051429
§ 371 (c)(1),
(2), (4) Date: Aug. 1, 2013

(87) PCT Pub. No.: WO2012/105372
PCT Pub. Date: Aug. 9, 2012

(65) Prior Publication Data
US 2013/0302686 A1  Nov. 14, 2013

(30) Foreign Application Priority Data
Feb. 3, 2011  (JP) .................................. 2011-021415

(51) Int. Cl.
*H01M 4/131* (2010.01)
*H01M 4/58* (2010.01)
(Continued)

(52) U.S. Cl.
CPC ............ *H01M 4/131* (2013.01); *H01M 4/1391* (2013.01); *H01M 4/366* (2013.01);
(Continued)

(58) Field of Classification Search
CPC .............. H01M 4/131; H01M 4/5825; H01M 10/0525; H01M 4/366; H01M 4/485; H01M 4/505; H01M 4/525; H01M 4/1391; H01M 2010/4292; H01M 2004/021; Y02E 60/122
See application file for complete search history.

(56) References Cited

U.S. PATENT DOCUMENTS

2007/0254209 A1  11/2007  Baba et al.
2009/0136850 A1*  5/2009  Yoon et al. ............... 429/231.95
(Continued)

FOREIGN PATENT DOCUMENTS

JP  2007 109533  4/2007
JP  2007 213866  8/2007
(Continued)

OTHER PUBLICATIONS

English Translation of JP2009218120A.*
(Continued)

*Primary Examiner* — Stewart Fraser
(74) *Attorney, Agent, or Firm* — Oblon, McClelland, Maier & Neustadt, L.L.P.

(57) ABSTRACT

A positive electrode material for non-aqueous electrolyte secondary batteries having high rate characteristics and high energy density, and a battery using the same are provided. The non-aqueous electrolyte secondary battery includes a positive electrode containing a positive electrode material, a conductive agent and a binder; a negative electrode; a separator; and a non-aqueous electrolyte, in which the positive electrode material contains core particles and a coating material that covers from 10% to 90% of the surfaces of the core particles, the core particles are formed of a compound represented by $Li_aM_bPO_4$ (wherein M represents at least one element selected from Fe, Mn, Co and Ni, and satisfies the relations: $0<a\leq 1.1$ and $0<b\leq 1$), and the coating material part is formed of a compound which is capable of insertion and extraction of Li ions in the potential range exhibited by the core particles at the time of charge and discharge.

10 Claims, 1 Drawing Sheet

(51) Int. Cl.
  *H01M 10/0525* (2010.01)
  *H01M 4/1391* (2010.01)
  *H01M 4/36* (2006.01)
  *H01M 4/485* (2010.01)
  *H01M 4/505* (2010.01)
  *H01M 4/525* (2010.01)
  *H01M 10/42* (2006.01)
  *H01M 4/02* (2006.01)

(52) U.S. Cl.
  CPC ............ *H01M 4/485* (2013.01); *H01M 4/505* (2013.01); *H01M 4/525* (2013.01); *H01M 4/5825* (2013.01); *H01M 10/0525* (2013.01); *H01M 2004/021* (2013.01); *H01M 2010/4292* (2013.01); *Y02E 60/122* (2013.01)

(56) References Cited

U.S. PATENT DOCUMENTS

| | | | |
|---|---|---|---|
| 2009/0155689 A1 | 6/2009 | Zaghib et al. | |
| 2009/0236564 A1 | 9/2009 | Yasunaga et al. | |
| 2010/0163790 A1 | 7/2010 | Ceder et al. | |
| 2010/0327223 A1 | 12/2010 | Zaghib et al. | |
| 2012/0264018 A1* | 10/2012 | Kong et al. | 429/220 |

FOREIGN PATENT DOCUMENTS

| | | |
|---|---|---|
| JP | 2007 250433 | 9/2007 |
| JP | 2007 317534 | 12/2007 |
| JP | 2008-159446 A | 7/2008 |
| JP | 2009-218120 A | 9/2009 |
| JP | 2009218120 A * | 9/2009 |
| JP | 2009-301749 A | 12/2009 |
| JP | 2010-238390 A | 10/2010 |
| WO | WO 2008/091707 A2 | 7/2008 |
| WO | WO 2011072547 A1 * | 6/2011 |

OTHER PUBLICATIONS

Office Action issued Apr. 8, 2014 in Japanese Patent Application No. 2011-021415 (with partial English language translation).
Extended European Search Report issued Jun. 17, 2014 in Patent Application No. 12741809.3.
Kuthanapillil M. Shaju, et al., "A Stoichiometric Nano-LiMn$_2$O$_4$ Spinel Electrode Exhibiting High Power and Stable Cycling" Chemistry of Materials, vol. 20, No. 17, XP055121655, Sep. 9, 2008, pp. 5557-5562.
Myounggu Park, et al., "A review of conduction phenomena in Li-ion batteries" Journal of Power Sources, vol. 195, No. 24, XP055121556, Dec. 15, 2010, pp. 7904-7929.
Office Action issued Jan. 20, 2015 in Japanese Patent Application No. 2011-021415 (with English language translation).
Combined Office Action and Search Report issued Feb. 4, 2015 in Chinese Patent Application No. 201280007604.8 (with English language translation).
International Search Report Issued Apr. 10, 2012 in PCT/JP12/051429 Filed Jan. 24, 2012.
Office Action issued Jul. 14, 2015, in corresponding Japanese Patent Application No. 2011-021415, (with English-language Translation).
Office Action issued Jun. 16, 2015 in European Patent Application No. 12 741 809.3.
Chinese Office Action issued Oct. 10, 2015, in corresponding Chinese patent Application No. 201280007604.8 (with English-language Translation).

* cited by examiner

NON-AQUEOUS ELECTROLYTE SECONDARY BATTERY

This application is a 371 of PCT/JP 2012/051429 filed Jan. 24, 2012 . Priority to Japanese patent application 2011 - 021415 , filed Feb. 3, 2011 , is claimed.

TECHNICAL FIELD

The exemplary embodiment relates to a battery using a positive electrode material for non-aqueous electrolyte secondary batteries.

BACKGROUND ART

In recent years, non-aqueous electrolyte secondary batteries that are charged and discharged as Li ions move between the negative electrode and the positive electrode are anticipated as large-sized energy storage devices for stationary type power generating systems such as photovoltaic power generation, from the viewpoint of environmental problems and the like.

Such non-aqueous electrolyte secondary batteries are required to have characteristics of withstanding the use for a long time period, or a low risk of ignition or explosion in the event of accident, at a level equal to or higher than that of those non-aqueous electrolyte batteries used in small-sized mobile telephones, notebook PCs and the like.

Non-aqueous electrolyte secondary batteries using polyanionic compounds as the positive electrode active material have high cycle stability and safety, and have therefore been practically applied as a stationary type power source. However, polyanionic compounds generally lack electron conductivity, and it is difficult to use the compounds by themselves. Therefore, positive electrode active materials produced by coating a polyanionic compound with a carbon material having high electron conductivity such as graphite are known. A positive electrode active material coated with a carbon material has excellent electron conductivity; however, the material lacks Li ion conductivity, and its rate characteristics are deteriorated when the material is excessively coated. In addition, since the carbon material used to coat the polyanionic compound does not contribute to the Li ion insertion and extraction, there is a problem that the charge-discharge capacity of the battery is deteriorated.

CITATION LIST

Patent Literature

[Patent Literature 1] Japanese Patent Application Laid-Open No. 2007-109533

SUMMARY OF INVENTION

Technical Problem

Thus, it is an object of the invention according to the exemplary embodiment to provide a battery which uses a positive electrode material for non-aqueous electrolyte secondary batteries, having excellent rate characteristics or excellent cycle capability.

Solution to Problem

The non-aqueous electrolyte secondary battery according to the exemplary embodiment includes a positive electrode containing a positive electrode material, a conductive agent and a binder; a negative electrode; a separator; and a non-aqueous electrolyte, characterized in that the positive electrode material contains core particles and a coating material that covers at least a portion of the surfaces of the core particles, and the core particles are formed of a compound represented by the formula: $Li_aM_bPO_4$ (wherein M represents at least one element selected from Fe, Mn, Co and Ni, and satisfies the relations: $0<a\leq1$ and $0<b\leq1$), while the coating part is formed of a compound which is capable of insertion and extraction of Li ions in the potential range exhibited by the core particles at the time of charge and discharge.

DESCRIPTION OF EMBODIMENTS

The positive electrode material for non-aqueous electrolyte secondary batteries according to the exemplary embodiment is a material in which at least a portion of the surface of the polyanionic compound that forms the core particles has been coated with a coating material (active material).

The core material according to the exemplary embodiment is a polyanionic compound represented by the formula: $Li_aM_bPO_4$ (wherein M represents at least one element selected from Fe, Mn, Co and Ni, and satisfies the relations: $0<a\leq1.1$ and $0<b\leq1$). This core material contains a $PO_4$ tetrahedron in the crystal structure, and the core material does not easily release oxygen even when the battery is accidentally brought to a high temperature state, and has a low risk of ignition. Furthermore, since the crystal structure is stable, and the volume change at the time of charge and discharge is small, the core material has high cycle characteristics, and high battery capacity is obtained by extracting more Li ions. Particularly, the olivine type lithium iron phosphate composite oxide is expected to have a long service life because the material undergoes small volume changes during charge and discharge, and thus, attention is paid to the material as an active material for stationary type batteries.

In the polyanionic compounds represented by olivine type lithium iron phosphate, since a so-called polyanion in which elements such as phosphor, sulfur and vanadium have been introduced into the oxygen lattice in the crystal structure is included, the release of oxygen does not easily occur, and the stability at high temperature is enhanced. However, in the case of these compounds (for example, compounds containing phosphoric acid), electrons are likely to be localized by the P—O bond, and electron conductivity is decreased.

Therefore, the electron conductivity of the polyanionic compounds is lower as compared with the general positive electrode active materials for lithium ion secondary batteries. Specifically, the electron conductivity of $LiFePO_4$ is about $1(10^{-10}$ S/cm. In order for such a polyanionic compound that is close to an insulating substance, to secure an electron conductivity of a practical level ($10^{-6}$ S/cm or higher) as a positive electrode active material, it is necessary to devise measures such as using a polyanionic compound in the core particles and coating the surfaces of the core particles with a conductive material. If the electron conductivity of the positive electrode active material (positive electrode material of the exemplary embodiment) is lower than $10^{-6}$ S/cm, it is not preferable to use the positive electrode active material in the secondary batteries having low rate characteristics. Meanwhile, the term electron conductivity as used herein is a value obtained by shaping a simple active material into a pellet form, disposing ion blocking electrodes at both ends, constructing a measuring cell, passing a direct current through the cell, and measuring the voltage across the pellet.

As the coating material for the polyanionic compounds, carbon-based materials have been used hitherto. However, since the Li ion insertion and extraction reaction potential of carbon-based materials is 0.1 to 2 V vs. Li/Li$^+$, for example, when core particles having a reaction potential in the range of 2.5 V to 4.5 V vs. Li/Li$^+$ are coated with a carbon-based material, the carbon-based material cannot contribute to the charge and discharge capacity of the core particles. Therefore, when the core particles are coated with a carbon material, the electron conductivity required by the positive electrode material may be obtained, but the charge-discharge capacity per unit electrode weight of the battery decreases. Furthermore, since carbon-based materials lack Li ion conductivity, there is also a problem that when a large amount of a carbon-based material is used for coating, the capacity at the time of high speed charge and discharge decreases.

A positive electrode material having excellent electron conductivity and excellent charge-discharge capacity has been obtained by coating at least a portion of the surface of a polyanionic compound with a positive electrode active material which is capable of carrying out the Li ion insertion and extraction reaction at the time of charge and discharge of the polyanionic compound.

As the conditions capable of performing charge and discharge of the coating material at the time of charge and discharge of the polyanionic compound, it is preferable that the Li ion insertion and extraction potential of the coating material lie between the charge termination potential and the discharge termination potential of the core particles of the exemplary embodiment.

A specific example of the coating material of the exemplary embodiment capable of satisfying such conditions may be at least one or more compounds selected from Li (Ni$_x$Co$_y$Mn$_z$) O$_2$, Li(Ni$_x$Co$_y$Al$_z$)O$_2$, LiMn$_2$O$_4$ and LiVO$_2$ (satisfying the relations: $x \leq 0$, $y \leq 0$, $z \leq 0$, and $x+y+z=1$).

On the other hand, a material having a Li ion insertion and extraction potential that is not between the charge termination potential and the discharge termination potential of polyanionic compounds, such as a carbon or Si-based alloy negative electrode or Li$_{2.6}$Co$_{0.4}$N, or a material which is not capable of Li ion insertion and extraction, such as ZrO or Al$_2$O$_3$, cannot contribute to a capacity increase. Therefore, these materials cannot be used as coating materials.

Since a positive electrode material produced by coating core particles with a coating material having high electron conductivity can be ostensibly dealt with as particles having the electron conductivity of the coating material, the rate characteristics can be enhanced. Furthermore, the coating material of the exemplary embodiment is also capable of Li ion insertion and extraction similarly to the core particles and can contribute to a capacity increase. However, if the charge termination potential of the coating material is lower as compared with the charge plateau potential of the core particles, the coating part becomes overcharged at the time of charge of the core particles that account for most of the capacity, so that the system becomes less safe, and the crystal structure is destroyed, causing deterioration of the cycle characteristics. Furthermore, since the core particles undergo a rapid increase in the potential at the end stage of charge, if the charge termination potential of the coating material is greater than the plateau potential, overcharge hardly occurs in the coating part. Therefore, in regard to the coating material of the exemplary embodiment, from the viewpoint of safety, it is not preferable to use a coating material having a high possibility of causing overcharge, and therefore, it is preferable to use a compound having a charge termination potential that is equal to or higher than the charge plateau potential of the core particles, as the coating material.

According to the exemplary embodiment, a positive electrode material in which core particles having low electron conductivity are coated on the surfaces with a coating material having high electron conductivity is used. Basically, an effect of improving electron conductivity in the vicinity of the coating part (the coating material that covers at least a portion of the surfaces of the core particles) can be expected. The effect of coating the core particles with a coating material is obtained even if the coating amount of the coating material is a small amount such as 1% by mass based on the core particles. It is preferable if the coating material is dispersed over the entire surfaces of the core particles, rather than in the case where the coating material is localized on the surfaces of the core particles, because the surfaces of the core particles can have excellent electron conductivity over all. Therefore, if the core particle material and the coating material are just simply mixed and prepared into an electrode, the coating material is not sufficiently dispersed, and the improvement of electron conductivity occurs insufficiently, which is not preferable. It is preferable that the coating material cover from 10% to 90% of the surfaces of the core particles. Meanwhile, if the coating material covers the entire surfaces of the core particles, the diffusion of Li ions is inhibited by the coating material, and thus it is not preferable.

It is known in regard to the polyanionic positive electrode material that during high temperature storage or the like, if hydrofluoric acid (HF) is present in the electrolyte solution, transition metal components are easily eluted into the electrolyte solution, and subsequently, the transition metal components precipitate out as metals on the surface of the negative electrode, causing an increase in the resistance. Accordingly, when lithium hexafluorophosphate (LiPF$_6$) or the like, which can easily generate hydrofluoric acid as a result of hydrolysis, is used as a supporting salt, the high temperature storage characteristics or the cycle characteristics are prone to deteriorate. When the surface of the polyanionic positive electrode material is coated with a coating material, the elution of metal ions from the core particles can be reduced. Therefore, when the coating material broadly covers the surfaces of the core particles, the charge-discharge capacity, the rate characteristics and the storage characteristics can be simultaneously improved, and thus it is preferable. On the other hand, in an electrode structure in which the core material and the coating material are simply co-present such as in the case of merely mixing two kinds of active materials, the elution of metal ions from those sites that are not covered cannot be reduced, and the improvement of not only the electron conductivity but also the high temperature storage characteristics or cycle characteristics is insufficiently achieved, which is not preferable.

The primary particle size of the core particles is from 300 nm to 5 μm.

The primary particle size of the coating material is from 10 nm to 1 μm.

The dimensional relations between the coating particle size and the core particle size are preferably such that the relation of [core particles>coating particles] be always satisfied, and from the viewpoint of uniformly coating the surfaces, it is more preferable that the coating particle size be ¹/₁₀ or less of the core particle size.

The average secondary particle size of the positive electrode material after coating is from 500 nm to 20 μm. The thickness of the coating part is preferably from 10 nm to 1 μm. If the thickness of the coating part is smaller than 10 nm, the contact property between the positive electrode particles or between the conductive agent and the coating part is deteriorated, so that the effect of improving the rate characteristics is decreased, which is not preferable. Furthermore, if the thickness of the coating part is greater than 1 μm, not only the average particle size of the positive electrode material increases, but also the influence of the volume changes occurring along with the charge and discharge of the coating part increases, so that the cycle characteristics and the like are deteriorated, which is not preferable.

If the coating amount of the coating material is 1% by mass or greater relative to the mass of the core particles, an obvious enhancement of the rate characteristics or capacity can be confirmed. If the coating amount of the coating material is 3% by mass or greater relative to the mass of the core particles, the rate characteristics are markedly enhanced. This implies that a coating amount of 1% by mass is not sufficient to entirely coat the core particles, and the continuity between the coating parts is also insufficient. On the other hand, it can be speculated that when the coating amount is 3% by mass or greater, the coating parts dispersed on the surfaces of the core particles are brought into contact with each other and are continuously connected, so that electrons can be conducted between the positive electrode material and the collector, without any disconnection of sites having high electron conductivity. Furthermore, when the coating amount increases, there is a risk that safety may decrease. Therefore, the coating amount of the coating material is preferably 15% by mass or less, and more preferably 10% by mass or less, relative to the mass of the core particles. Meanwhile, the coating amount is the percentage by mass of the coating material relative to the core particles used in the production of the positive electrode material.

The non-aqueous electrolyte secondary battery according to the exemplary embodiment of the present invention includes at least a positive electrode which contains a positive electrode material for non-aqueous electrolyte secondary batteries as an active material, a negative electrode, and a non-aqueous electrolyte.

The positive electrode material for non-aqueous electrolyte secondary batteries is a material in which at least a portion of the surfaces of the core particles has been covered with the coating material according to the exemplary embodiment.

The positive electrode of a non-aqueous electrolyte secondary battery is a product obtained by, for example, suspending and mixing the positive electrode material of the exemplary embodiment, a conductive agent and a binder in an appropriate solvent, applying a coating liquid thus prepared on one surface or both surfaces of a collector, and drying the coating liquid.

Examples of the conductive agent of the positive electrode of the exemplary embodiment include acetylene black, carbon black, and graphite.

Examples of the binder of the positive electrode of the exemplary embodiment include polytetrafluoroethylene (PTFE), polyvinylidene fluoride (PVdF), fluororubbers, ethylene butadiene rubbers (SBR), and carboxymethyl cellulose.

The mixing ratio of the positive electrode material, the conductive agent of the positive electrode and the binder of the positive electrode is preferably such that the proportion of the positive electrode material is from 73% by mass to 95% by mass, the proportion of the conductive agent is from 3% by mass to 20% by mass, and the proportion of the binder is from 2% by mass to 7% by mass.

The method for producing the positive electrode material of the exemplary embodiment will be described.

There are no particular limitations on the method for synthesizing the polyanionic compound that forms the core particles. Examples of this synthesis method include a solid phase method, a liquid phase method, a sol-gel method, and a hydrothermal method. For example, particles of $LiFePO_4$ can be produced according to a method such as described below.

For example, it is desirable to produce the material by stirring under heating a precursor aqueous solution containing a Li source, a Fe source and a P source at a molar ratio of approximately Li:Fe:P=1:1:1, drying the precursor aqueous solution, and calcining the precursor aqueous solution. For example, conventionally known compounds, such as lithium hydroxide as the Li source, iron sulfate heptahydrate as the Fe source, and ortho-phosphoric acid as the P source, can be used.

There are no particular limitations on the method for synthesizing the particles that constitute the coating material of the exemplary embodiment. Examples of this synthesis method include a solid phase method, a liquid phase method, a sol-gel method, a hydrothermal method, and a molten salt method. Specifically, the synthesis method includes mixing the precursors of the polyanionic core particles and the coating material, allowing the mixture to react to thereby produce a coating material on the surfaces of core particles, and separating composite particles from the reaction product. The particle size of the coating material of the exemplary embodiment is smaller than the particle size of the core particles.

As the method of the exemplary embodiment of coating core particles with a coating material, for example, in the case of using $LiCoO_2$ in the coating material, a hydrothermal synthesis method, which is a wet coating method, may be mentioned as an example. A precursor aqueous solution is prepared by dissolving a Li source and a Co source in water. Examples of the Li source include lithium hydroxide, lithium carbonate, lithium acetate, lithium nitrate, and lithium chloride. Examples of the Co source include cobalt chloride, cobalt sulfate, cobalt nitrate, and cobalt acetate. Coated particles are obtained by incorporating polyanionic compound particles produced as the core particles into a precursor aqueous solution, heating the mixture under stirring to allow the mixture to react, and drying the reaction product. In this occasion, since the particle size of $LiCoO_2$ thus synthesized changes with the temperature and time of the hydrothermal reaction, and the proportion of the Li source, the thickness of the coating part can be controlled. If the thickness of the coating part varies, even if the same mass of the material is used, the extent of coverage varies. Therefore, the coverage ratio can be controlled by regulating the hydrothermal conditions. For example, in the case of the heating temperature, as the temperature is lower; in the case of the reaction time, as the time is shorter; and as the proportion of the Li source is larger, the crystal grains that are produced become smaller. Thus, the film thickness decreases, and the coverage ratio increases. Therefore, the coverage ratio for the core particles can be increased even if a small amount of the coating material is used, and the coverage ratio can be adjusted to 10% to 90%. Such heating is preferably carried out in the range of 80° C. to 250° C., and more preferably in the range of 100° C. to 170° C. Furthermore, the reaction time is preferably in the range of 1 hour to 24 hours, and more preferably in the range of 6 hours to 12 hours. The proportion of the Li source is preferably such that the molar ratio to the Co source is in the range of 0.1 to 10, and more preferably in the range of 1 to 5. Thereafter, the coating particles thus obtained are filtered, washed and dried, and thus composite particles are synthesized. It is preferable to perform drying at a temperature in the range of 80° C. to 250° C. through vacuum drying. Furthermore, the composite particles thus obtained may be further calcined. In this case, it is preferable to perform calcination in an inert atmosphere of nitrogen, argon or the like, and there are occasions in which it is preferable to mix the inert gas with oxygen gas at a proportion of 0% to 10%. The calcination temperature is preferably in the range of 400° C. to 1000° C., and more preferably in the range of 500° C. to 700° C.

As described above, when a technique of dispersing core particles in precursors is used, composite particles having a controlled film thickness and a controlled coverage ratio can be produced uniformly on the surfaces of the core particles. The coating method is not necessarily limited to the method described above, and any conventionally known method can be used.

The thickness of the coating material that covers the core particles can be measured by, for example, observing the particle surfaces by TEM. Furthermore, the coverage ratio of the particles is measured by the following method. Through an observation by TEM, the surface length of the core particles at the surfaces of the composite particles is determined. Subsequently, the length of the area covered by the coating material is determined, and the percentage ratio of the length relative to the core particle surfaces of the coated area was designated as the coverage ratio (%).

The negative electrode of the exemplary embodiment is produced by suspending a negative electrode mixture containing a negative electrode active material, a conductive agent and a binder in an appropriate solvent, mixing the suspension, applying a coating liquid thus prepared on one surface or both surfaces of a collector band, and drying the coating liquid.

Examples of the negative electrode active material of the exemplary embodiment include a mixture of lithium titanium complex oxide and lithium complex oxide.

As the conductive agent of the negative electrode of the exemplary embodiment, a carbon material is usually used. Examples of this conductive agent include acetylene black and carbon black.

Examples of the binder of the negative electrode of the exemplary embodiment include polytetrafluoroethylene (PTFE), polyvinylidene fluoride (PVdF), fluororubbers, ethylene butadiene rubbers (SBR), and carboxymethyl cellulose.

The mixing ratio of the negative electrode active material, the conductive agent of the negative electrode and the binder of the negative electrode is preferably such that the proportion of the negative electrode active material is from 70% by mass to 95% by mass, the proportion of the conductive agent is from 0% by mass to 25% by mass, and the proportion of the binder is from 2% by mass to 10% by mass.

Example of the non-aqueous electrolyte of the exemplary embodiment include a liquid non-aqueous electrolyte prepared by dissolving an electrolyte in a non-aqueous solvent (non-aqueous electrolyte solution), a polymer gel-like electrolyte containing a non-aqueous solvent and an electrolyte in a polymer material, a polymer solid electrolyte containing an electrolyte in a polymer material, and an inorganic solid electrolyte having lithium ion conductivity.

As the non-aqueous solvent used in the liquid non-aqueous electrolyte of the exemplary embodiment, a non-aqueous solvent known for the use in lithium batteries can be used, and examples thereof include cyclic carbonates such as ethylene carbonate and propylene carbonate; and a non-aqueous solvent mainly composed of a solvent mixture of a cyclic carbonate as a first solvent and a non-aqueous solvent having a lower viscosity than the cyclic carbonate as a second solvent.

Examples of the second solvent include linear carbonates such as dimethyl carbonate, methyl ethyl carbonate, and diethyl carbonate; γ-butyrolactone, acetonitrile, methyl propionate, ethyl propionate; tetrahydrofuran and 2-methyltetrahydrofuran as cyclic ethers; and dimethoxyethane and diethoxyethane as linear ethers.

Examples of the electrolyte of the exemplary embodiment include alkali salts, and particularly lithium salts. Examples of the lithium salts include lithium hexafluorophosphate, lithium tetrafluoroborate, lithium arsenic hexafluoride, lithium perchlorate, and lithium trifluoromethanesulfonate. Particularly, lithium hexafluorophosphate and lithium tetrafluoroborate are preferred. The amount of the electrolyte of the exemplary embodiment dissolved in the non-aqueous solvent of the exemplary embodiment is preferably set to from 0.5 mol/l to 2.0 mol/l.

As the gel-like electrolyte of the exemplary embodiment, examples of a polymer material prepared by dissolving the solvent of the exemplary embodiment and the electrolyte of the exemplary embodiment in a polymer material and solidifying the solution include polymers such as polyacrylonitrile, polyvinylidene fluoride, and polyethylene oxide, and copolymers thereof.

The solid electrolyte of the exemplary embodiment may be a product prepared by dissolving the electrolyte of the exemplary embodiment in the polymer material of the exemplary embodiment, and solidifying the solution. Furthermore, ceramic materials containing lithium may be used as the inorganic solid electrolyte. Examples of the inorganic solid electrolyte of the exemplary embodiment include $Li_3N$, and $Li_3PO_4$—$Li_2S$—$SiS_2$ glass.

A separator may be disposed between the positive electrode and the negative electrode of the exemplary embodiment.

The separator of the exemplary embodiment is a member intended to prevent the contact between the positive electrode and the negative electrode, and is composed of an insulating material. Furthermore, the separator having a configuration in which the electrolyte can move between the positive electrode and the negative electrode is used. Specific examples thereof include non-woven fabrics made of synthetic resins, a polyethylene porous film, a polypropylene porous film, and a cellulose-based separator.

Furthermore, in combination with this separator, or as the separator, a product formed by laminating the gel-like electrolyte or solid electrolyte of the exemplary embodiment may also be used.

Figure 1:
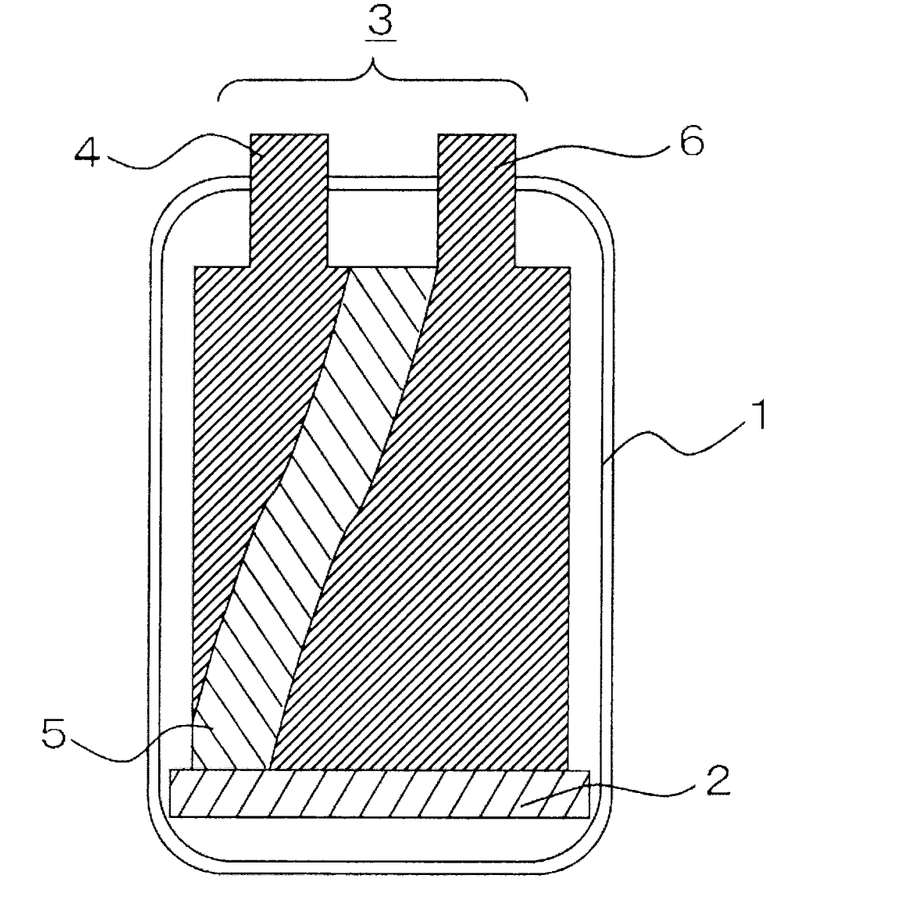
FIG. 1 is a conceptual diagram of the non-aqueous electrolyte secondary battery according to the exemplary embodiment.

The conceptual diagram of an example of the non-aqueous electrolyte secondary battery of the exemplary embodiment is shown in FIG. 1. For example, an insulator 2 is disposed at the bottom of a bottomed, cylindrical container 1 made of stainless steel. An electrode group 3 is disposed in the container 1. The electrode group 3 is composed of a positive electrode 4, a separator 5, and a negative electrode 6. The separator 5 is interposed between the positive electrode 4 and the negative electrode 6, and the positive electrode 4 and the negative electrode 6 are wound in a coil form so that the electrodes are not in contact.

EXAMPLES

Hereinafter, Examples will be described. The Examples are instances of the exemplary embodiment of the present invention, and those exemplary embodiments and Examples that maintain the purport of the present invention are included in the scope of the present invention.

Example 1

First, lithium iron phosphate oxide (LiFePO$_4$) that would form the core particles were produced as the positive electrode material, by a solid phase method. As the materials of the core particles, iron oxalate dihydrate (FeC$_2$O$_4$.2H$_2$O), ammonium dihydrogen phosphate (NH$_4$H$_2$PO$_4$), and lithium carbonate (Li$_2$CO$_3$) were respectively mixed at a molar ratio of 1:1:0.5, and the mixture was subjected to calcination for 2 hours at a temperature of 700° C. in a nitrogen atmosphere. It was confirmed by ICP-OES that the compound thus obtained was lithium iron phosphate oxide (LiFePO$_4$). Furthermore, it was confirmed by XRD that the Fe$_2$P impurity phase was absent in the lithium iron phosphate oxide (LiFePO$_4$). The product was observed by SEM, and it was confirmed that the average primary particle size was about 1 μm.

Subsequently, lithium cobalt oxide (LiCoO$_2$) was produced by a hydrothermal method as a coating material on the surface of the LiFePO$_4$ produced as the core particles. The amount of the Co source was adjusted such that the mass ratio of LiFePO$_4$ and LiCoO$_2$ after the synthesis would be 100:1 (LiFePO$_4$:LiCoO$_2$). Lithium nitrate (CoNO$_3$·6H$_2$O) as a material of the coating material was stirred for 12 hours in an aqueous solution of sodium hydroxide, and the mixture was dried for 12 hours in a vacuum dryer at 80° C. to thereby produce a precursor. The precursor thus obtained and lithium hydroxide (LiOH·H$_2$O) were respectively dissolved in water at a molar ratio of 1:1. While the content of the container was stirred, a hydrothermal synthesis was carried out for 12 hours at 150° C. The product was filtered and was subjected to vacuum drying for 12 hours at 100° C., and thus a powdered positive electrode material was obtained. The product was analyzed by XRD, and it was confirmed that there was no impurity phase. The positive electrode material was observed by TEM, and as a result, it was confirmed that LiFePO$_4$ was coated on the surface with LiCoO$_2$ at an average thickness of 20 nm. It was confirmed from the ratio of the surfaces of the LiFePO$_4$ particles and the length of the coating part, that the coverage ratio was 50%.

A positive electrode mixture prepared by mixing 85 parts by mass of the powdered positive electrode material thus obtained, 5 parts by mass each of graphite and acetylene black as conductive agents, and 5 parts by mass of PVdF as a binder, was added to NMP (N-methyl-2-pyrrolidone), and the mixture was applied on an aluminum foil (collector) having a thickness of 15 μm. The aluminum foil on which the positive electrode mixture was applied was dried, and then was subjected to a press treatment. Thus, a positive electrode having an electrode density of 2.2 g/cm$^3$ was produced.

Subsequently, a negative electrode was produced.

A negative electrode mixture prepared by mixing 85 parts by mass of powdered spinel-type lithium titanium oxide (Li$_4$Ti$_5$O$_{12}$) as a negative electrode active material, 5 parts by mass of graphite and 3 parts by mass of acetylene black as conductive agents, and 5 parts by mass of PVdF as a binder was added to NMP, and the mixture was applied on an aluminum foil (collector) having a thickness of 15 μm. The aluminum foil on which the positive electrode mixture was applied was dried and then was subjected to a press treatment. Thus, a negative electrode was produced.

The positive electrode thus produced, a separator, and the negative electrode were laminated in the described order, and the laminate was wound in a coil form such that the negative electrode would be on the outer peripheral side. Thus, an electrode group was produced.

As the separator, a separator formed from cellulose and a porous film made of polyethylene was employed.

Lithium hexafluorophosphate was dissolved in an amount of 1.0 mol/l in a solvent mixture prepared by mixing ethylene carbonate and diethyl carbonate at a proportion of 1:2 as a volume ratio, and thus a non-aqueous electrolyte solution was prepared.

The electrode group thus produced, and the non-aqueous electrolyte solution thus prepared were respectively accommodated in a bottomed, cylindrical container made of stainless steel, and thus a cylindrical non-aqueous electrolyte secondary battery was assembled. Meanwhile, the coating amounts of the positive electrode and the negative electrode were adjusted such that the overall capacity of the secondary battery thus assembled would be 1000 mAh.

The initial capacity (mAh/g), the rate characteristics (mAh/g) and the cycle characteristics (mAh/g), each per unit mass, of the positive electrode of the non-aqueous electrolyte secondary battery thus assembled were measured under the conditions described below. The measurement environment temperature was set at 25° C., and the battery was subjected to constant current-constant voltage charge up to 2.2 V at 1 C rate, and to constant current discharge down to 1.2 V at 0.2 C rate. Thus, the initial capacity was measured. Subsequently, the battery was subjected to constant current-constant voltage charge at 1 C rate, and then to constant current discharge down to 1.2V at 5 C rate, and the discharge capacity was measured as the rate characteristics. The battery was subjected to 10 cycles of constant current-constant voltage charge at 1 C rate, and subsequent constant current discharge down to 1.2 V at 1 C rate, and then the discharge capacity at the 10th cycle was measured as the cycle characteristics.

The results are presented in Table 1.

Examples 2 to 7

The production of the positive electrode material was carried out in the same manner as in Example 1, except that the proportions of LiFePO$_4$ and LiCoO$_2$ were adjusted at the ratios indicated in Table 1.

Examples 8 to 13

The production of the positive electrode material was carried out in the same manner as in Example 1, except that LiFePO$_4$ and the coating material indicated in Table 1 were adjusted at a mass ratio of 100:6.

Examples 14 and 15

The production of the positive electrode material was carried out in the same manner as in Example 1, except that the core particles indicated in Table 1 were used, and the mass ratio of the core particles and the coating material was adjusted to 100:6.

Examples 16 to 19

The production of the positive electrode material was carried out in the same manner as in Example 1, except that the core particles indicated in Table 1 were used, and the mass ratio of the core particles and the coating material was adjusted to 100:1 to 100:4.

Comparative Examples 1 to 3

The production of the positive electrode material was carried out in the same manner as in Example 1, except that the core particles indicated in Table 1 were used, and the process of coating the core particles with the coating material was omitted.

Comparative Examples 4 to 12

The production of the positive electrode material was carried out in the same manner as in Example 1, except that the coating material indicated in Table 1 was used, and the production was carried out at the ratios indicated in Table 1.

Comparative Example 13

The production of the positive electrode material was carried out in the same manner as in Example 1, except that the core particles and the coating material indicated in Table 1 were used, and the production was carried out by mixing at the ratios indicated in Table 1, while the coating process was omitted.

non-aqueous electrolyte secondary batteries of the Examples, each of which used a positive electrode material obtained by coating the surfaces of the core particles of a polyanionic compound with the coating material of the exemplary embodiment, had enhanced battery capacities in all cases, as compared with the non-aqueous electrolyte secondary batteries of the Comparative Examples in which the core particle surfaces were not coated. Furthermore, in Comparative Examples 4 and 5, it can be speculated that the initial capacities were small because the core particles were coated with a compound having low electron conductivity. That is, it was found that the battery capacity of the positive electrode material could be improved by coating the core particles with a coating material having high electron conductivity such as in the case of the exemplary embodiment.

When a comparison was made between Examples 1 to 13 and Comparative Examples 1 and 7 to 9, it was confirmed that the discharge capacity and the rate characteristics were

TABLE 1

| | Core material | Coating material | Core material:coating material (mass ratio) | Initial capacity (mAh/g) | Rate characteristics (mAh/g) | Cycle capacity (mAh/g) |
|---|---|---|---|---|---|---|
| Example 1 | $LiFePO_4$ | $LiCoO_2$ | 100:1 | 121 | 58 | 117 |
| Example 2 | $LiFePO_4$ | $LiCoO_2$ | 100:2 | 130 | 76 | 127 |
| Example 3 | $LiFePO_4$ | $LiCoO_2$ | 100:3 | 145 | 103 | 142 |
| Example 4 | $LiFePO_4$ | $LiCoO_2$ | 100:4 | 154 | 110 | 138 |
| Example 5 | $LiFePO_4$ | $LiCoO_2$ | 100:6 | 154 | 113 | 150 |
| Example 6 | $LiFePO_4$ | $LiCoO_2$ | 100:10 | 150 | 112 | 144 |
| Example 7 | $LiFePO_4$ | $LiCoO_2$ | 100:15 | 149 | 109 | 135 |
| Example 8 | $LiFePO_4$ | $LiMn_2O_4$ | 100:6 | 144 | 80 | 139 |
| Example 9 | $LiFePO_4$ | $LiMnO_2$ | 100:6 | 141 | 103 | 139 |
| Example 10 | $LiFePO_4$ | $LiNiO_2$ | 100:6 | 151 | 109 | 136 |
| Example 11 | $LiFePO_4$ | $LiNi_{1/3}Co_{1/3}Mn_{1/3}O_2$ | 100:6 | 157 | 112 | 148 |
| Example 12 | $LiFePO_4$ | $LiVO_2$ | 100:6 | 142 | 69 | 141 |
| Example 13 | $LiFePO_4$ | $LiNi_{1.5}Mn_{0.5}O_2$ | 100:6 | 129 | 99 | 84 |
| Example 14 | $LiMnPO_4$ | $LiCoO_2$ | 100:6 | 120 | 40 | 89 |
| Example 15 | $LiCoPO_4$ | $LiCoO_2$ | 100:6 | 132 | 73 | 99 |
| Example 16 | $LiMnPO_4$ | $LiNiO_2$ | 100:1 | 108 | 1 | 90 |
| Example 17 | $LiMnPO_4$ | $LiNiO_2$ | 100:2 | 111 | 1 | 93 |
| Example 18 | $LiMnPO_4$ | $LiNiO_2$ | 100:3 | 119 | 20 | 98 |
| Example 19 | $LiMnPO_4$ | $LiNiO_2$ | 100:4 | 121 | 33 | 99 |
| Comparative Example 1 | $LiFePO_4$ | | | 110 | 40 | 109 |
| Comparative Example 2 | $LiMnPO_4$ | | | 105 | 1 | 87 |
| Comparative Example 3 | $LiCoPO_4$ | | | 93 | 1 | 54 |
| Comparative Example 4 | $LiFePO_4$ | $Al_2O_3$ | 100:6 | 73 | 1 | 43 |
| Comparative Example 5 | $LiFePO_4$ | $LiCoPO_4$ | 100:6 | 89 | 29 | 67 |
| Comparative Example 6 | $LiFePO_4$ | $ZrO$ | 100:6 | 138 | 87 | 126 |
| Comparative Example 7 | $LiFePO_4$ | Carbon | 100:1 | 125 | 85 | 120 |
| Comparative Example 8 | $LiFePO_4$ | Carbon | 100:3 | 141 | 103 | 139 |
| Comparative Example 9 | $LiFePO_4$ | Carbon | 100:6 | 137 | 106 | 134 |
| Comparative Example 10 | $LiFePO_4$ | $LiV_2O_4$ | 100:6 | 145 | 73 | 139 |
| Comparative Example 11 | $LiFePO_4$ | $V_2O_5$ | 100:6 | 89 | 45 | 73 |
| Comparative Example 12 | $LiFePO_4$ | $Li_{2.6}Co_{0.4}N$ | 100:6 | 106 | 70 | 67 |
| Comparative Example 13 | $LiFePO_4$ | $LiCoO_2$ | 100:6 | 112 | 51 | 96 |

When a comparison made between Examples 1 to 19 and Comparative Examples 1 to 3, it was confirmed that the enhanced in all cases as compared with Comparative Example 1. In the case of $LiFePO_4$ which was not coated, since the electron conductivity was insufficient, the resistance during discharge was large, and because electrochemically inactive particles also existed, even if the rate was low, the ratio of the discharge capacity relative to the theoretical capacity (170 mAh/g) (=discharge efficiency) was about 60%. On the other hand, it was confirmed from the results of Example 1 and Comparative Example 7, that when the core particle surfaces are coated with a material having high conductivity, the electron conductivity increases, and electron conduction is carried out between the respective particles, so that the discharge capacity increases.

When the coating amount is increased as shown in Comparative Examples 7 to 9, electron conductivity further improves, and the ratio of the discharge capacity relative to the theoretical capacity increases. However, since carbon does not contribute to charge and discharge, a decrease occurs in the theoretical capacity itself. In Comparative Example 9, the theoretical capacity of the particles including the carbon coated thereon decreases to 160 mAh/g. As a result, when the coating amount of carbon is increased, the discharge capacity decreases. On the other hand, in Examples 1 to 13, since the coating part contributes to charge and discharge, even if the coating amount was increased, the theoretical capacity hardly decreased, and as a result, a high discharge capacity was obtained. Particularly, as shown in Example 11, it was found that when a material having a higher theoretical capacity than that of LiFePO$_4$ that forms the core particles is used in coating, the theoretical capacity increases along with the effect of improving electron conductivity, and thus a high battery capacity is obtained.

When a comparison is made between Examples 1 to 7 and Comparative Example 1, as the proportion of the coating material relative to the core particles continuously increases up to a certain value, the capacity and the rate characteristics are enhanced. This is because when the proportion of the area of the coating material covering the surfaces of the core particles increased, the electron conductivity of the positive electrode material was improved. However, as shown in Example 1, if the proportion of the coating material is insufficient, the coating material at the surfaces of the core particles is dispersed and is in an isolated state. Accordingly, the network formation of electron conductivity occurs unsatisfactorily, and the effect of improving the rate characteristics is decreased.

On the other hand, when the proportion of the coating material increases as shown in Example 7, the effect of the deterioration of the cycle characteristics of the coating material itself is increased. In the exemplary embodiment of the present invention, it is intended to enhance the electrode capacity and the rate characteristics while maintaining the characteristics of the polyanionic compound having excellent safety and cycle properties. Thus it is preferable to use the coating material to the extent that the characteristics of the core particles are not impaired. As described above, it is preferable to use the coating material in an amount in the range of from 3% by mass to 10% by mass relative to the mass of the core particles.

When a comparison is made between Examples 1 to 7 and Comparative Example 13, it was found that all of the charge-discharge capacity, rate characteristics and cycle characteristics were enhanced in all Examples, as compared with Comparative Example 13 in which the coating material was simply mixed with the core particles. In Example 5, the coverage ratio was 80%, while in Comparative Example 13, even if the same mass of the coating material was used, the coverage ratio was 5%. This is because, in Comparative Example 13, since LiCcO$_2$ particles were merely in point contact with the surfaces of the core particles of LiFePO$_4$, and the particles were also unevenly distributed, there were fewer contact sites with the core particles. In such a state, since the effect of improving the rate characteristics using the coating material was insufficient, not only the rate characteristics, but also the charge-discharge capacity and the cycle characteristics deteriorated to the same extent as in the case where coating was not carried out. That is, it was found that when a material having high electron conductivity is coated on the surface as in the case of the exemplary embodiment, a positive electrode material that is excellent in the charge-discharge capacity, rate characteristics and cycle characteristics may be obtained.

The foregoing description of the exemplary embodiment of the present invention has been provided. However, it is not intended to construe the invention in a manner limited to the precise forms disclosed above, and the invention can be specifically defined by making modifications and variations of the constituent elements to the extent that the gist is maintained. Furthermore, various inventions can be formed by appropriately combining the plural constituent elements disclosed in the exemplary embodiment. For example, the constituent elements according to different embodiments may be appropriately combined.

REFERENCE SIGNS LIST

1 CONTAINER
2 INSULATOR
3 ELECTRODE GROUP
4 POSITIVE ELECTRODE
5 SEPARATOR
6 NEGATIVE ELECTRODE

The invention claimed is:

1. A non-aqueous electrolyte secondary battery comprising:
   a positive electrode comprising a positive electrode material, a conductive agent and a binder;
   a negative electrode;
   a separator; and
   a non-aqueous electrolyte,
   wherein the positive electrode material comprises core particles and a coating material that covers from 10% to 90% of the surfaces of the core particles,
   the core particles being formed of a compound represented by the formula: Li$_a$M$_b$PO$_4$(wherein M represents at least one element selected from Fe, Mn, Co and Ni, and satisfies the relations: $0 < a \leq 1.1$ and $0 < b \leq 1$), and
   the coating material being formed of at least one or more compounds selected from Li(Ni$_x$Co$_y$Mn$_z$)O$_2$, Li(Ni$_x$Co$_y$Al$_z$)O$_2$(each satisfying the relations: $x \geq 0, y \geq 0, z \geq 0$, and $x+y+z =1$) and LiVO$_2$ and capable of insertion and extraction of Li ions in a potential range exhibited by the core particles at the time of charge and discharge.

2. The non-aqueous electrolyte secondary battery according to claim 1, wherein a charge termination potential of the coating material is equal to or higher than the charge plateau potential of the core particles.

3. The non-aqueous electrolyte secondary battery according to claim 1, wherein a content of the coating material is from 1 % by mass to 15 % by mass relative to the total mass of the core particles and the coating material.

4. The non-aqueous electrolyte secondary battery according to claim 1, wherein a content of the coating material is from 3 % by mass to 10 % by mass relative to the total mass of the core particles and the coating material.

5. The non-aqueous electrolyte secondary battery according to claim 1, wherein an electron conductivity of the coating material is equal to or higher than $10^{-6}$ S/cm.

6. The non-aqueous electrolyte secondary battery according to claim 1, wherein the positive electrode material is a material synthesized from the core particles and a precursor of the coating material according to a hydrothermal synthesis method under the conditions of from 80° C. to 250° C.

7. The non-aqueous electrolyte secondary battery according to claim 1, wherein a coating particle size is equal to or less than 1/10 of the core particle size.

8. The non-aqueous electrolyte secondary battery according to claim 1, wherein the coating material consists of $Li(Ni_xCo_yMn_z)O_2$.

9. The non-aqueous electrolyte secondary battery according to claim 1, wherein the coating material consists of $Li(Ni_xCo_yAl_z)O_2$.

10. The non-aqueous electrolyte secondary battery according to claim 1, wherein the coating material consists of $LiVO_2$.

* * * * *